United States Patent [19]

Chou

[11] Patent Number: 5,333,385
[45] Date of Patent: Aug. 2, 1994

[54] MOVABLE AUTOMATIC SAWING AND CLAMPING FRAMEWORK

[76] Inventor: Chen-Wen Chou, 4F., No. 6, Lane 69, Min-Jyh Street, Yeong-Her City, Taipei Hsien, Taiwan

[21] Appl. No.: 54,413

[22] Filed: Apr. 27, 1993

[51] Int. Cl.⁵ .............................................. B27B 9/04
[52] U.S. Cl. ....................................... 30/371; 30/310; 83/488; 83/574; 83/745
[58] Field of Search ............... 83/574, 745, 522.19, 83/488, 489; 30/310, 371–374; 33/27.031, 27.032, 27.033, 27.04, 27.06, 27.07, 640, 641, 644

[56] References Cited

U.S. PATENT DOCUMENTS

| | | | |
|---|---|---|---|
| 2,770,265 | 11/1956 | Pollock | 83/574 X |
| 4,023,273 | 5/1977 | Treleaven | 30/373 |
| 4,397,207 | 8/1983 | Isaac | 83/745 X |
| 4,621,427 | 11/1986 | Bergler | 30/310 X |
| 5,016,354 | 5/1991 | Baine | 83/745 X |
| 5,033,347 | 7/1991 | Hillestad et al. | 83/745 X |
| 5,165,317 | 11/1992 | Findlay | 83/574 |
| 5,203,389 | 4/1993 | Goodwin | 83/574 X |

Primary Examiner—Eugenia Jones
Attorney, Agent, or Firm—Pro-Techtor International

[57] ABSTRACT

A movable and automatic sawing and clamping device for wood, wherein two pipe-like frame portions are separated from each other by a suitable distance. Two sets of horizontal pieces are orthogonal to these portions and are separately provided therebetween. A clamping device can be formed between these horizontal pieces for clamping a saw tool therebetween. The whole clamping framework can be moved by means of a plurality of bottom rollers to cut the workpiece.

8 Claims, 9 Drawing Sheets

MOVABLE AUTOMATIC SAWING AND CLAMPING FRAMEWORK

BACKGROUND OF THE INVENTION

The present invention relates to a movable and automatic sawing and clamping framework for wood and especially to a framework forming a movable clamping device for doing automatic or manual linear or circular cutting work on wood.

A piece of wood cut from a log may need various additional treatment, such as sawing it to a given length as well as width or cutting a circular arc into the wood.

Current art cutting machines generally have its electric sawing blade installed on a fixed working table. The wood will be pushed toward the saw for cutting.

As shown in FIG. 1, there is a conventional electric saw structure for sawing a piece of wood wherein an electric saw blade 11 is mounted on a working table 10. The saw blade extends above the plane at the table 10 and rotates. A workpiece 12 can then be pushed toward the blade 11 to be cut thereby.

The workpiece 12 pushed toward the knife 11 can be cut into the shape needed. However, there are drawbacks in such a situation, chief among them being the following: the work table 10 being fixed is inconvenient for moving to other processing places. The saw must be operated by a skillful workman. Further, when it is desired to cut from the workpiece 12 a central circular portion 13, the central circular portion 13 must be cut out by making many successive tangential cuts 14, 15. This is time consuming, and the shape of the final product cannot be perfectly round.

SUMMARY OF THE INVENTION

The principal object of the present invention is to provide a movable and automatic sawing and clamping device for wood, wherein two pipe-like frame portions are separated from each other by a suitable distance. Two sets of horizontal pieces are orthogonal to these portions and are separately provided therebetween. A clamping device can be formed between these horizontal pieces for clamping a saw tool therebetween. The whole clamping framework can be moved by means of a plurality of bottom rollers to cut the workpiece.

A further object of the present invention is to provide a sawing and clamping device for wood, wherein the above mentioned pipe-like frame portions have a driving motor mounted thereon for driving the whole clamping framework to and from, so as to automatically cut a board.

Another object of the present invention is to include on one end of both the pipe-like frame portions another horizontal piece orthogonal thereto. A center punch is provided on this piece, and a motor is provided for driving a roller provided at a location relatively far from the center punch, so as to automatically cut out a circular shape.

Another object of the present invention is to provide a sawing and clamping device for wood, each of the pipe-like frame portions being provided with a sheet wheel and a bottom toothed roller for cooperating with a vertical toothed rail to implement vertical cutting.

Other objects as well as features and effects of the present invention will be apparent to one skilled in the art from the detailed description of the preferred embodiments thereof with reference to the accompanying drawings.

DETAILED DESCRIPTION OF THE PREFERRED EMBODIMENT

Figure 1:
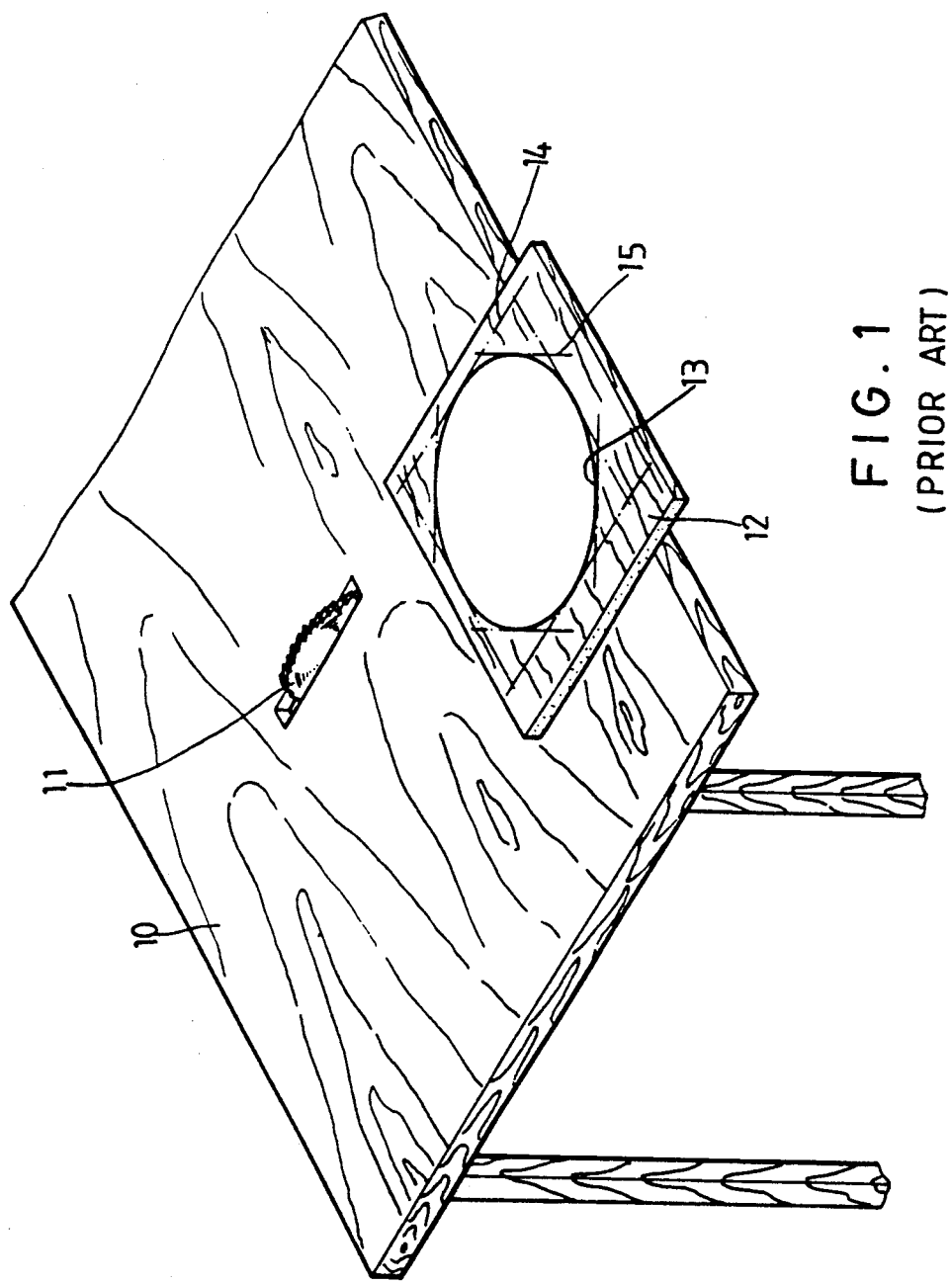
FIG. 1 is a schematic view of the structure of a conventional saw device.
Figure 2:
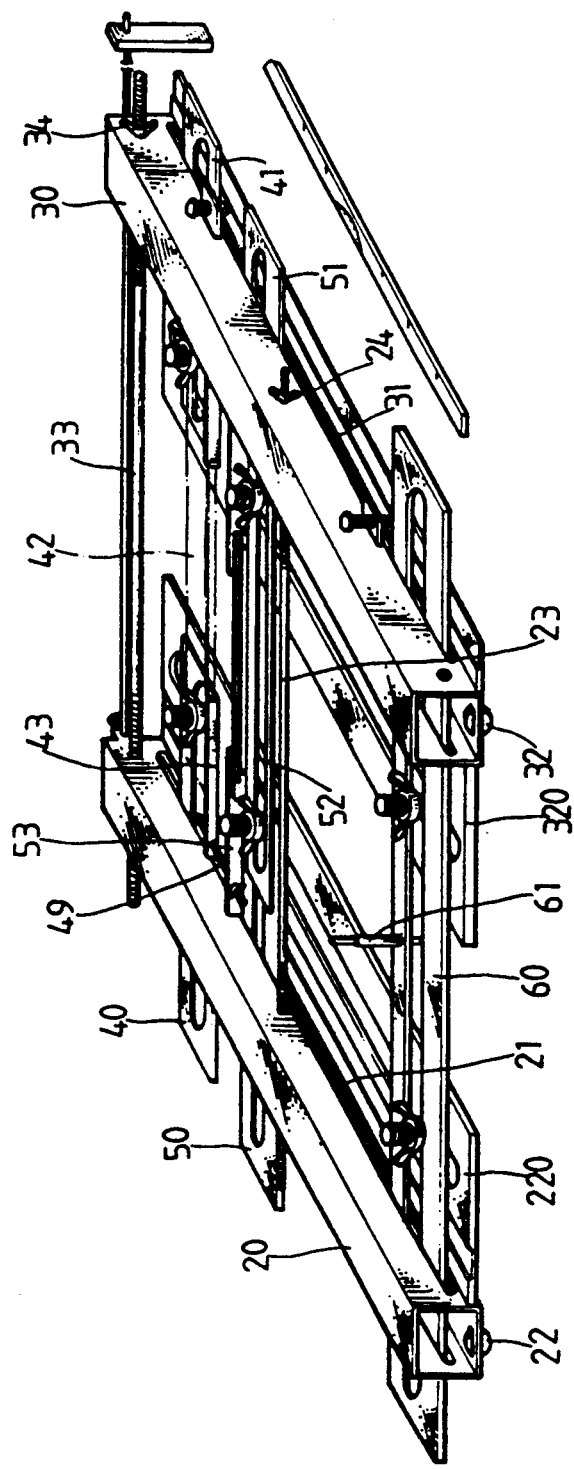
FIG. 2 is a perspective view of an embodiment of the present invention.
Figure 3:
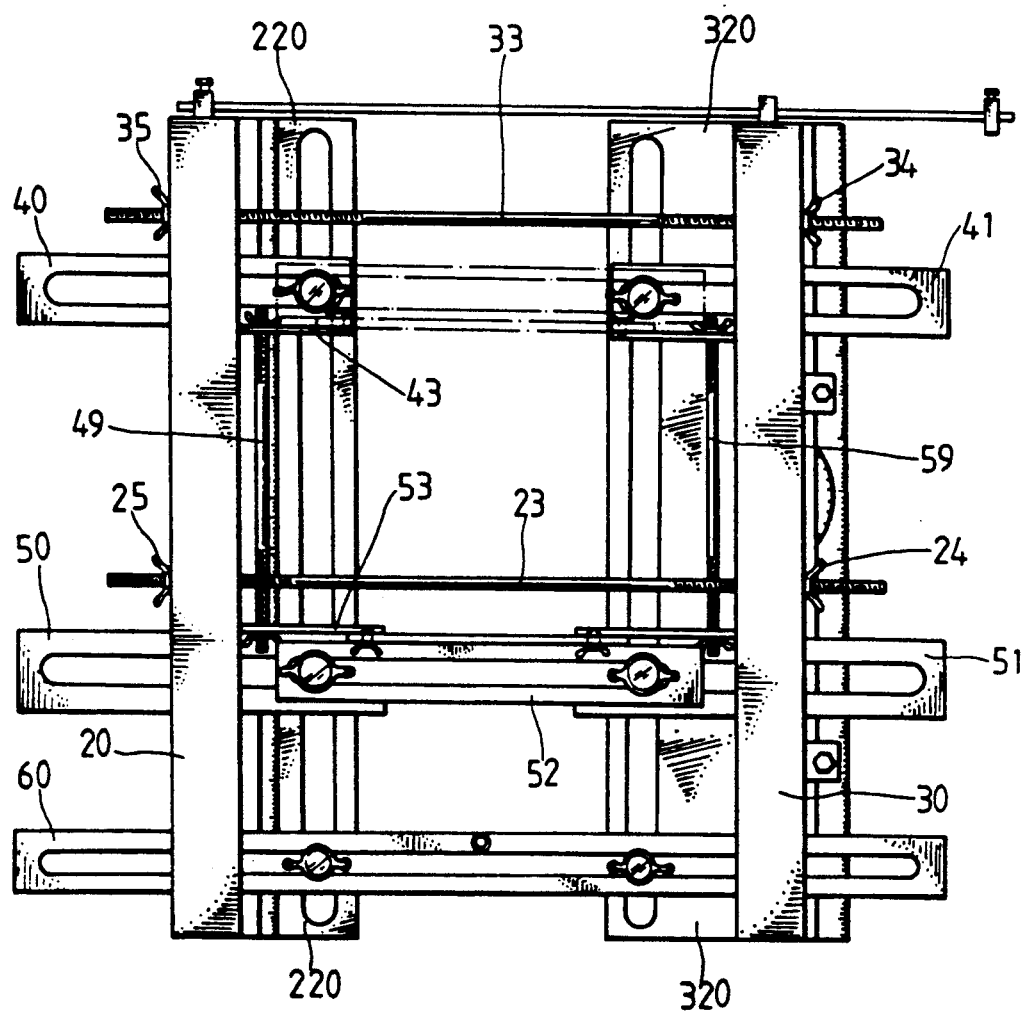
FIG. 3 is a top view of the embodiment shown in FIG. 2.

Referring to FIGS. 2, and 3, the present invention has two hollowed pipe-like frame portions 20, 30 separated from each other by a suitable distance. The vertical sides of the frame portions 20, 30 each have a slot 21, 31 extending therein almost to its entire length. The slots 21, 31 are parallel to each other. On the bottom of each end of the frame portions 20, 30, there are rollers 22, 32. There are bottom base plates 220, 320, used for anchoring a plurality of bolts. The two portions 20, 30 are pierced respectively by two transverse bolts 23, 33. The distance between the two portions 20, 30 is adjusted by using a plurality of nuts 24, 25, 34 and 35 to change the effective length of the bolts 23, 33.

These two portions 20, 30 have therebetween two sets of horizontal pieces 40-41, 50-51 orthogonal thereto. These horizontal pieces all extend through the slots 21, 31 in the frame portions 20, 30. Between the horizontal pieces 40-41, 50-51, there are respectively lapping pieces 42, 52 to which vertical stop plates 43, 53 are connected respectively. Between these stop plates 43, 53 there are bolts 49, 59 provided for adjusting the distance therebetween.

At one end of the frame portions distant from the horizontal pieces 40-41, 50-51, there is another horizontal through plate 60 which has near its center position a center punch 61 capable of being pressed down to punch a center point. The through plate 60 has its ends extended through the slots 21, 31 in the two frame portions 20, 30, and can be moved horizontally along the length of the frame portions 20, 30.

Figure 4:
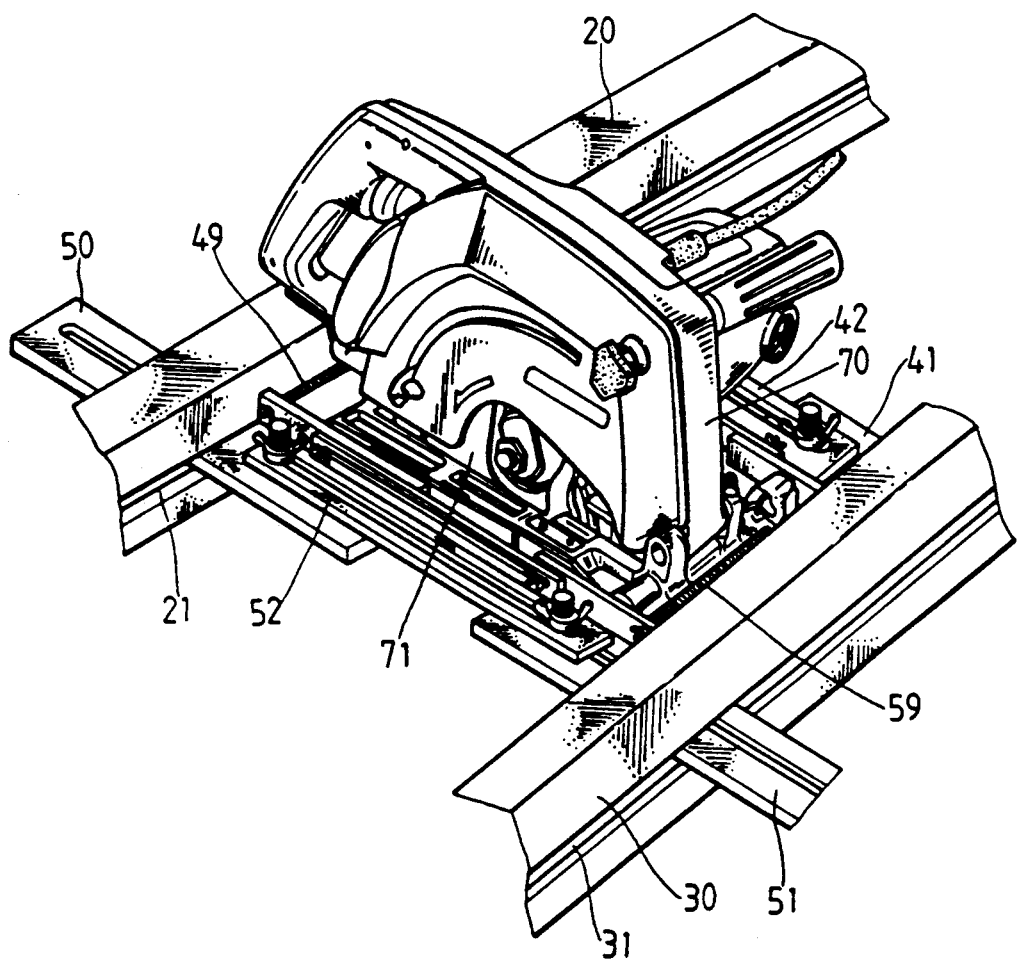
FIG. 4 is a partially enlarged view of the embodiment shown in FIG. 2 with a linear cutting tool installed.

As shown in FIG. 4, when the bolts 23, 33 and 49, 59 have been adjusted, the pipe-like frame portions 20, 30 and the stop plates 43, 53 form therebetween a space suitable for clamping therein various types of sawing tools 70. The one shown is a linear type sawing tool. When the whole framework is pushed to move, the rotating blade 71 provided on the saw 70 can cut the workpiece (not shown) thereunder. This is a manual type embodiment.

Figure 5:
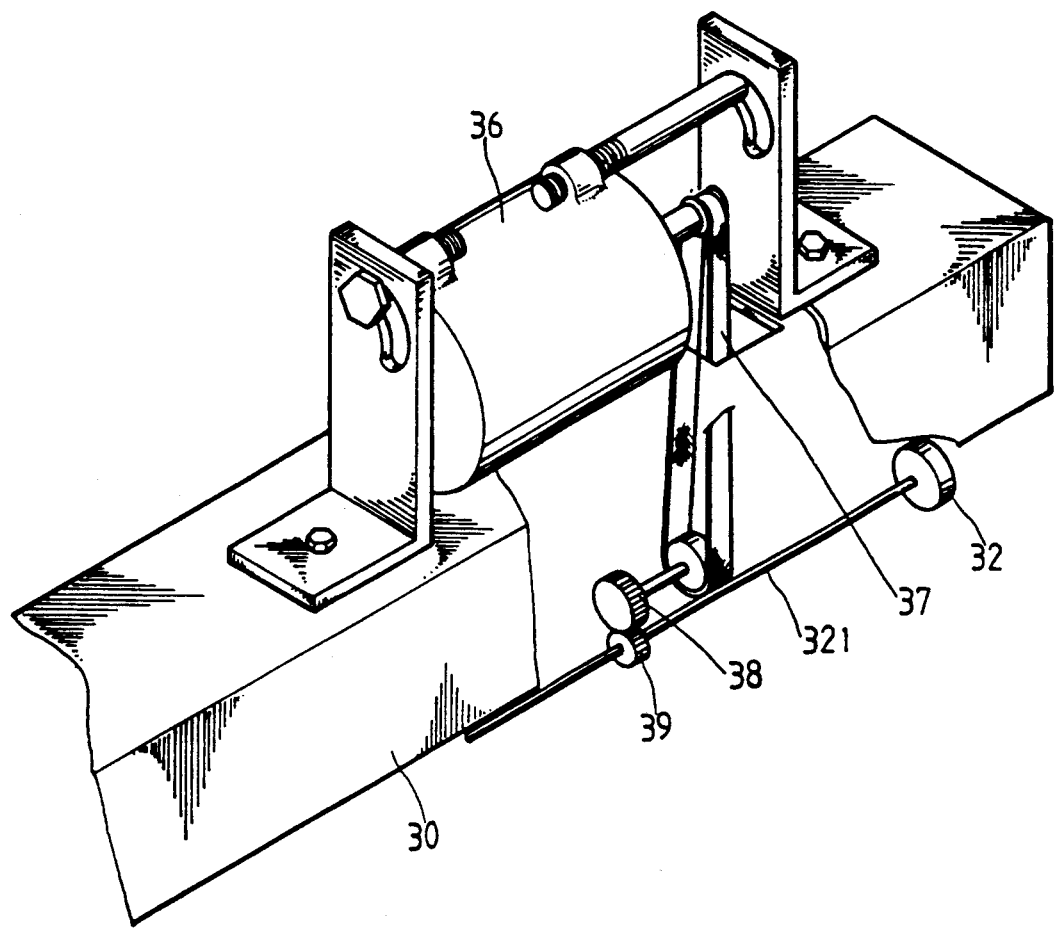
FIG. 5 is a partially exploded view showing the embodiment of FIG. 2 with an automatic driving motor installed.

Referring to FIG. 5, on the surface of one pipe-like frame portion 30, a small driving motor 36 is mounted. A center axle of the motor 36 can drive a gear 38 via a belt 37. A gear 39 engaged with the gear 38 is installed on an axle rod 321 connected to a bottom roller 32 so that the rotation force can be transmitted from the motor 36 to the bottom roller 32. The whole clamping framework can be linear driven to and from.

Figure 6:
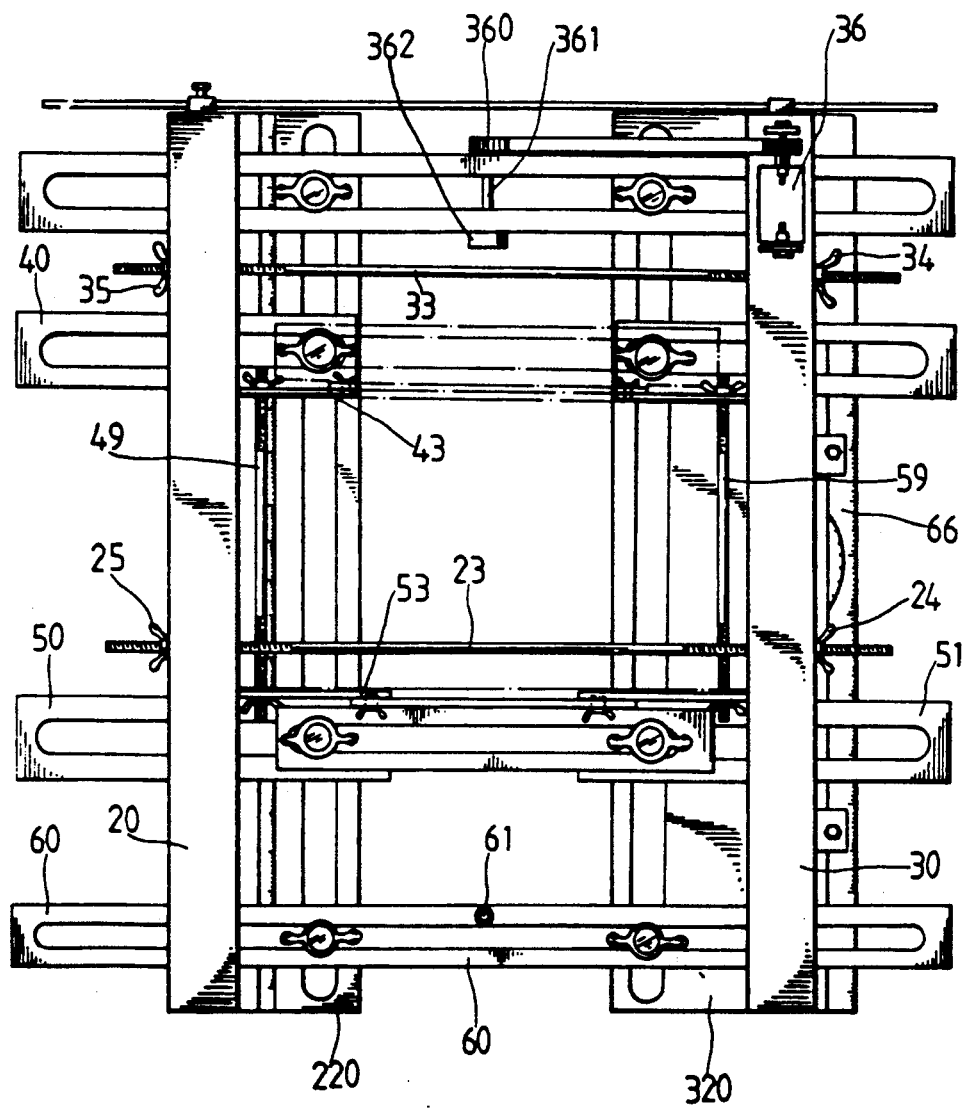
FIG. 6 is a schematic view of another embodiment of the present invention with a driving motor for cutting out a circular shape installed.

The motor 36 shown in FIG. 5 can also drive gear 360 (FIG. 6). The axle 361 of this gear 360 can in turn drive another touching roller 362 which is located at the end of the framework opposite to the center punch 61.

Figure 7:
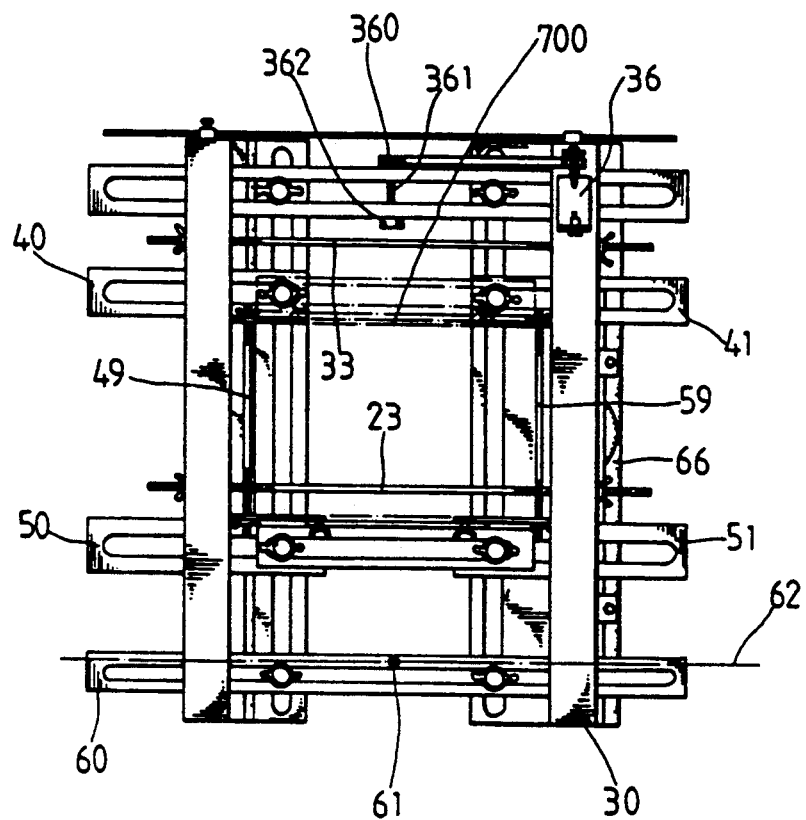
FIG. 7 is a schematic view of the embodiment shown in FIG. 6 showing the circular movement.

Referring to FIG. 7, when it is desired to cut out a circular piece of wood, the through plate 60 can be moved to align the position of the center punch 61 with the center line 62 of the desired circular product. Then the center punch 61 can be pressed down to punch a center point. The two sets of horizontal pieces 40–41, 50–51 can be moved relative to each other; therefore, the distance between the center of another sawing tool clamped therebetween and the center line 62 can be taken as a radius of the desired product. Then the rotation of the motor 36 can rotate the whole framework in a circular motion by means of the roller 362, and cut out a round piece of wood 701 as shown.

As shown in FIGS. 6 & 7, the framework can have a scale 66 provided on a side. The scale 66 is used for showing distances as well as angular positions. The distance between the center of the sawing tool and the center of the desired product can be clearly seen during the movement of the through plate 60 as well as the horizontal pieces 41, 51. And certainly, the scale 66 can also be used in cutting a linear or bevel distance or angular distance.

Figure 8:
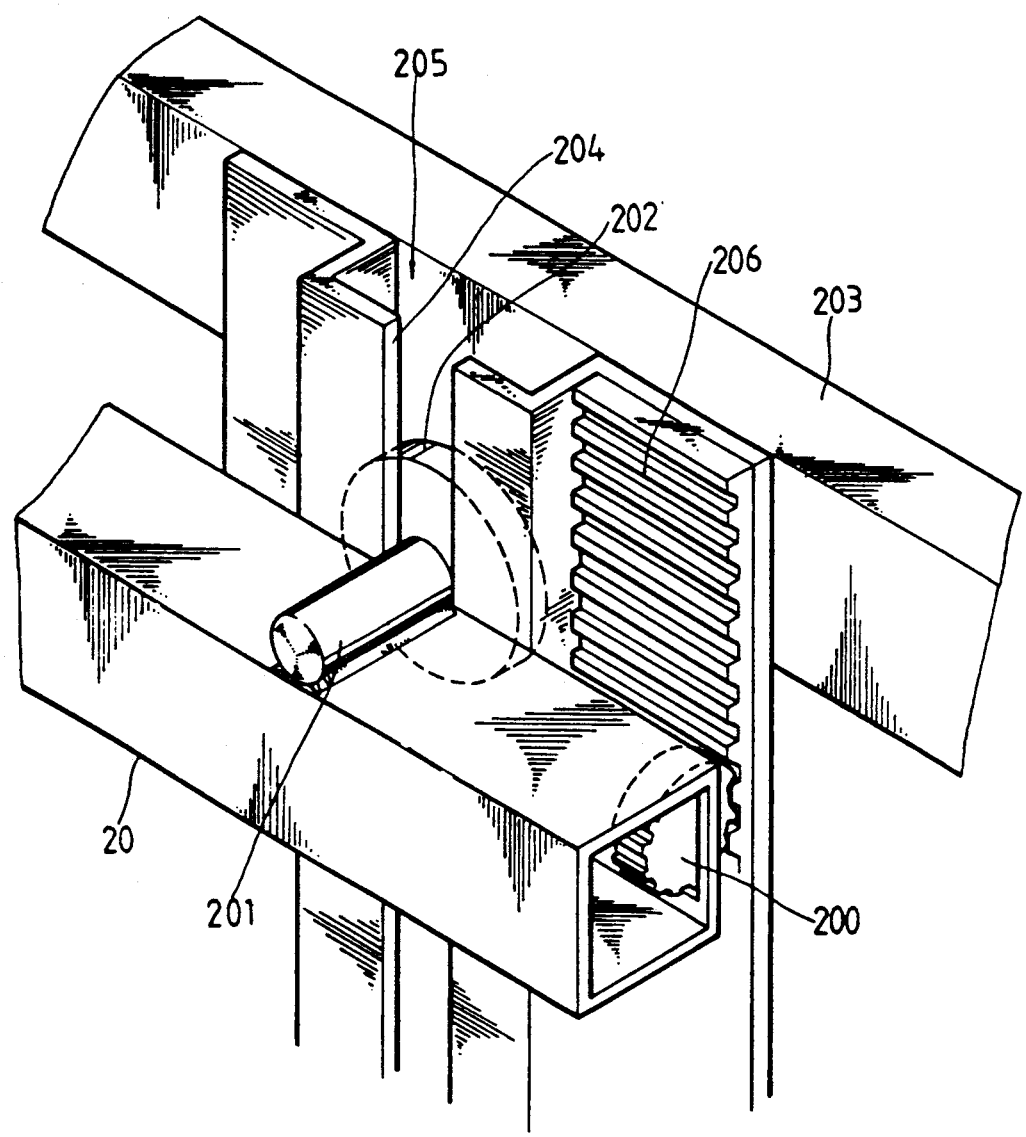
FIG. 8 is a perspective view showing a part of another embodiment of the present invention adapted for vertical cutting.

In another practical embodiment of the present invention (FIG. 8), a bottom toothed roller 200 can be provided on the pipe-like frame portion 20. Also provided thereon is a wheel 202 which is connected with a lateral supporting axle 201. A rail support 203 generally attached to a wall, includes angled pieces 204 which form an upper opening 204. One of the angles pieces 204 includes toothed rail 206. The wheel 202 of the pipe-like frame portion 20 can be put into the opening 205, while the toothed roller 200 can be meshed with the toothed rail 206. The whole framework can thereby be used to cut in a vertical direction.

Figure 9:
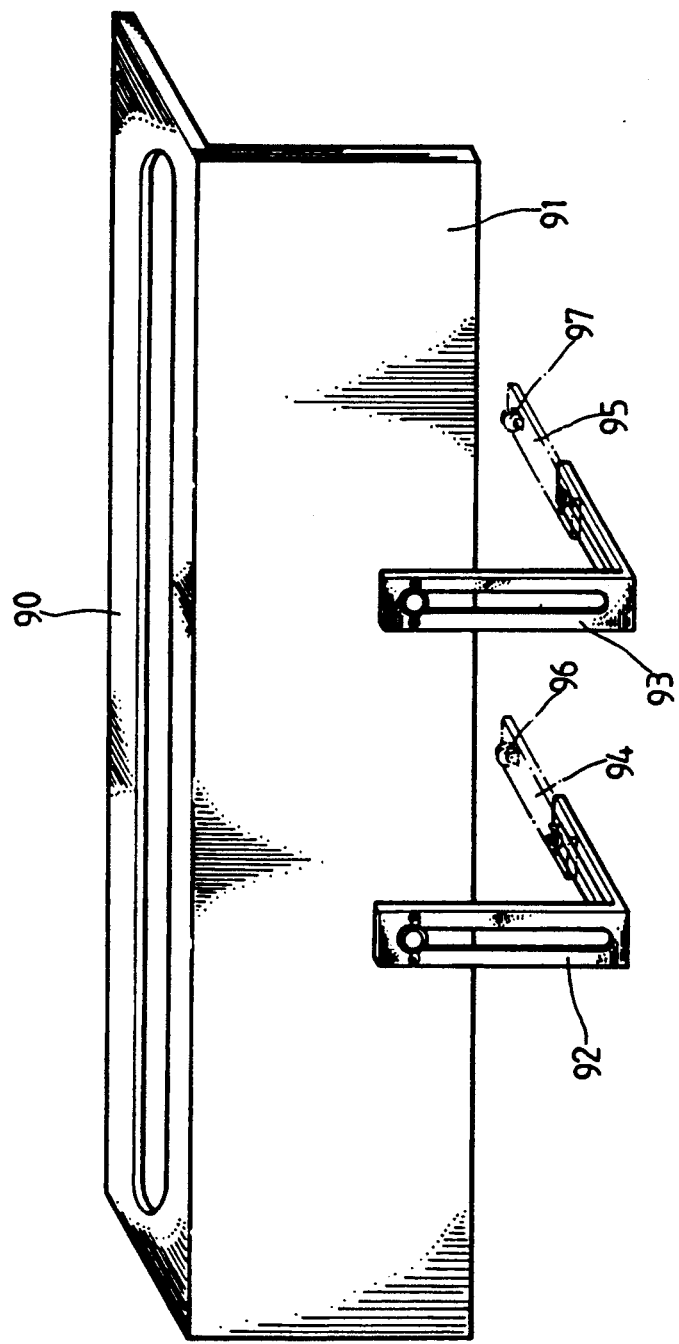
FIG. 9 is a perspective view of a stabilizing piece of the present invention.

Referring to FIG. 9, a stabilizing piece 90 is provided for the framework of the present invention. The piece 90 can be connected to the top surface of a member such as the bottom base plate 220, 320. The piece 90 has a vertical portion 91 to which are connected two L-shaped pieces 92, 93, separated from each other, and two adjusting pieces 94, 95 with upper rollers 96, 97 mounted on the ends of the horizontal portions of the L shaped pieces 92, 93 respectively. The rollers 96, 97 can abut against the bottom surface of the workpiece to assure a more stable movement for cutting.

Due to the convenient movement of the whole framework of the present invention to any processing location at any time, the mobility of the sawing tool is greatly increased. It can no longer be limited to any fixed location and thus is much more convenient. And due to the automatic moving and cutting abilities of the invention, the sawing tool can make a more rapid and accurate cuts in linear or circular directions.

My invention is to be construed as including all modifications and variations falling within the scope of the appended claims.

I claim:

1. A movable and automatic sawing and clamping framework for wood comprising:
    two hollow pipe-like frame portions parallel to and separated from each other by an adjustable distance, a bottom of each of the frame portions being provided with a roller and a bottom base plate;
    two sets of adjustable horizontal pieces, each horizontal piece extending through slots in a respective one of said frame portions in a direction perpendicular to the frame portions and being provided with a portion between said pipe-like frame portions, a sawing tool being clamped between said horizontal pieces;
    said framework being movable for cutting a workpiece; and wherein a stabilizing piece is provided adjacent to said pipe-like frame portions and is connected to top surfaces of said bottom base plates, and two separate L-shaped pieces attached to a vertical portion of said stabilizing piece, said L-shaped pieces each having a horizontal portion with an adjusting piece thereon which is provided with a roller for abutting against said workpiece.

2. The movable and automatic sawing and clamping framework for wood as claimed in claim 1 wherein:
    at one end of each of said two pipe-like frame portions there is a horizontal through plate extending through the slots in the frame portions and having a center punch located at a central position of said horizontal through plate for punching a center point in said workpiece.

3. A movable and automatic sawing and clamping framework for wood comprising:
    two hollow pipe-like frame portions parallel to and separated from each other by an adjustable distance, a bottom of each of the frame portions being provided with a roller and a bottom base plate;
    two sets of adjustable horizontal pieces, each horizontal piece extending through slots in a respective one of said frame portions in a direction perpendicular to the frame portions and being provided with a portion between said pipe-like frame portions, a sawing tool being clamped between said horizontal pieces;
    same framework being movable for cutting a workpiece; and wherein
    a toothed roller is provided at the bottom of one of said pipe-like frame portions and a wheel with a lateral supporting axle is provided on a side of said one frame portion; a rail support being provided on a wall including angled pieces which form an upper opening, one of said angled pieces having a toothed rail at one side thereof for meshing with said toothed roller in a driving relationship.

4. A movable and automatic sawing and clamping framework for wood as claimed in claim 3 wherein:
    a motor is provided on a surface of one of said pipe-like frame portions for driving said toothed roller at the bottom of said pipe-like frame portion through a driving device for moving the framework to cut said workpiece.

5. A movable and automatic sawing and clamping framework for wood as claimed in claim 3 wherein:
    a motor is provided on a surface of one of said pipe-like frame portions for driving a touching roller located between said frame portions through a driving device for moving the framework to cut said workpiece.

6. A movable and automatic sawing and clamping framework for wood comprising:

two hollow pipe-like frame portions parallel to and separated from each other by an adjustable distance, a bottom of each of the frame portions being provided with a roller and a bottom base plate;

two sets of adjustable horizontal pieces, each horizontal piece extending through slots in a respective one of said frame portions in a direction perpendicular to the frame portions and being provided with a portion between said pipe-like frame portions, a sawing tool being clamped between said horizontal pieces;

said framework being movable for cutting a workpiece; and wherein at one end of each of said two pipe-like frame portions there is a horizontal through plate extending through the slots in the frame portions and having a center punch located at a central position of said horizontal through plate for punching a center point in said workpiece, and wherein a toothed roller is provided at the bottom of one of said pipe-like frame portions and a wheel with a lateral supporting axle is provided on a side of said one frame portion; a rail support being provided on a wall including angled pieces which form an upper opening, one of said angled pieces having a toothed rail at one side thereof for meshing with said toothed roller in a driving relationship.

7. A movable and automatic sawing and clamping framework for wood as claimed in claim 6 wherein:

a motor is provided on a surface of one of said pipe-like frame portions for driving said toothed roller at the bottom of said pipe-like frame portion through a driving device for moving the framework for cut said workpiece.

8. A movable and automatic sawing and clamping framework for wood as claimed in claim 6 wherein:

a motor is provided on a surface of one of said pipe-like frame portions for driving a touching roller located between said frame portions through a driving device for moving the framework to cut said workpiece.

* * * * *